United States Patent
Cai et al.

(10) Patent No.: US 12,200,617 B2
(45) Date of Patent: Jan. 14, 2025

(54) SYSTEM AND METHOD FOR PROVISIONING MULTIPLE NETWORK SLICES FOR CONCURRENT USE BY AN APPLICATION

(71) Applicant: T-Mobile Innovations LLC, Overland Park, KS (US)

(72) Inventors: Zheng Cai, Fairfax, VA (US); Zheng Fang, McLean, VA (US)

(73) Assignee: T-MOBILE INNOVATIONS LLC, Overland Park, KS (US)

( * ) Notice: Subject to any disclaimer, the term of this patent is extended or adjusted under 35 U.S.C. 154(b) by 304 days.

(21) Appl. No.: 17/814,643

(22) Filed: Jul. 25, 2022

(65) Prior Publication Data
US 2024/0031924 A1   Jan. 25, 2024

(51) Int. Cl.
*H04W 48/18*   (2009.01)
*H04W 76/12*   (2018.01)

(52) U.S. Cl.
CPC .......... *H04W 48/18* (2013.01); *H04W 76/12* (2018.02)

(58) Field of Classification Search
None
See application file for complete search history.

(56) References Cited

U.S. PATENT DOCUMENTS

2022/0086939 A1* 3/2022 Qiao ...................... H04W 76/12
2023/0052699 A1* 2/2023 Ninglekhu ............. H04W 60/04

OTHER PUBLICATIONS

Sahu, Prasanna, "5G PDU Session Establishment" Published Jul. 31, 2021 https://web.archive.org/web/20210731194951/http://5gblogs.com/5g-pdu-session-establishment.
"5G Network Slicing: Understand the Challenges and Opportunities of 5G Network Slicing" Published Nov. 10, 2022 https://web.archive.org/web/20221110120615/https://www.viasolutions.com/en-us/5g-network-slicing.
"5G PDU Session and Its Types" Published Nov. 18, 2022 https://web.archive.org/web/20221118050933/https://www.techplayon.com/5g-pdu-session-and-its-types.
"5G RAN and 5GC Network Slice Signaling" Published Jun. 27, 2022 https://web.archive.org/web/20220627123733/https://www.techpalyon.com/5g-ran-and-5gc-network-slice-signaling.
5GWorldPro.com "How does 5G Network slicing works" Published May 12, 2020 https://www.5gworldpro.com/blog/2020/11/23/how-does-5g-network-slicing-works.

* cited by examiner

*Primary Examiner* — Walter J Divito
(74) *Attorney, Agent, or Firm* — Shook, Hardy & Bacon L.L.P.

(57) ABSTRACT

Aspects herein provide a system, media, and methods for provisioning and establishing multiple network slices for use by an application. In aspects, a particular application is able to provision a URLLC slice and an eMBB slice from a network. Based on a predefined policy associated with the application, the application communicates high priority data using a URLLC slice and non-priority data using the eMBB slice. The application can utilize unique headers on high priority data and non-priority data to implement the data prioritization schema, which the network can further use as filters. As such, the application can leverage the distinct characteristics of URLLC and eMBB to optimize the application's performance and operations at a user device and/or within the network.

20 Claims, 4 Drawing Sheets

SYSTEM AND METHOD FOR PROVISIONING MULTIPLE NETWORK SLICES FOR CONCURRENT USE BY AN APPLICATION

TECHNICAL FIELD

The present disclosure generally relates to radio network slicing of telecommunication band(s).

SUMMARY

A high-level overview of various aspects of the invention are provided here for that reason, to provide an overview of the disclosure and to introduce a selection of concepts that are further described below in the detailed description section. This summary is not intended to identify key features or essential features of the claimed subject matter, nor is it intended to be used as an aid in isolation to determine the scope of the claimed subject matter.

In brief and at a high level, this disclosure describes, among other things, methods, systems, and computer-readable media that facilitate provisioning multiple slices of a network for concurrent use by an application, wherein distinct slices are utilizes according to a data prioritization schema. Using the data prioritization schema, the application can leverage the different characteristics and technological benefits of different slice-types to wirelessly communicate different data types. The data prioritization schema may be specified in a predefined policy that the application utilizes to optimize the application's performance and operations at a user device and/or within a network.

In one aspect, a method is provided for improved data transmission reliability and optimized bandwidth capacity. In aspects, an Ultra-Reliable Low Latency Communications (URLLC) slice and an Enhanced Mobile Broadband (eMBB) slice are provisioned from a network using a unique application identifier for a particular application within the network. A URLLC slice identifier and an eMBB slice identifier are received, wherein the network maps the unique application identifier to the URLLC slice identifier and the eMBB slice identifier. Further, a session for the URLLC slice and another session for the eMBB slice are established for concurrent usage by the particular application. Based on a predefined policy for the particular application, the application determines to communicate data that corresponds to a first data type using the URLLC slice and to communicate other data that corresponds to another data type using the eMBB slice. Via a tunnel that is identifiable using the URLLC slice identifier, the data that corresponds to the first data type is communicated using the URLLC slice, wherein the data that corresponds to the first data type is communicated using a first header. Via another tunnel that is identifiable using the eMBB slice identifier, the other data that corresponds to the other data type is communicated using the eMBB slice, wherein the other data that corresponds to the other data type is communicated using a second header.

In another aspect, one or more non-transitory computer-readable media are provided for storing instructions that when executed via one or more processors performs a computerized method. Via one or more processors, a request is communicated to provision a URLLC slice and an eMBB slice from a network using a unique application identifier for a particular application instantiated at a user device. In response to the request, a confirmation is received from the network of the URLLC slice and the eMBB slice being provisioned for the particular application, wherein the confirmation include a URLLC slice identifier and an eMBB slice identifier, and wherein the network maps the unique application identifier to the URLLC slice identifier and the eMBB slice identifier. A session for the URLLC slice and another session for the eMBB slice is established for concurrent usage by the particular application. Based on a predefined policy for the particular application, the application determines to communicate data that corresponds to a first data type using the URLLC slice and to communicate other data that corresponds to another data type using the eMBB slice. Then, via a tunnel that is identifiable using the URLLC slice identifier, the data that corresponds to the first data type is communicated using the URLLC slice, wherein the data that corresponds to the first data type is communicated by the application using a first header. Also, via another tunnel that is identifiable using the eMBB slice identifier, the other data that corresponds to the other data type is communicated using the eMBB slice, wherein the other data that corresponds to the other data type is communicated by the application using a second header.

In yet another aspect, a system is provided. The system includes a telecommunications network communicatively coupled to a user device and one or more processors communicatively coupled to the network. The one or more processors are configured to receive a request from the user device to provision a URLLC slice and an eMBB slice from the telecommunications network using a unique application identifier for a particular application instantiated at the user device, wherein the particular application requests the URLLC slice and the eMBB slice based on a predefined policy that is specific to the particular application. In response to the request, a confirmation that the URLLC slice and the eMBB slice are provisioned for the particular application instantiated at the user device is communicated, wherein the confirmation include a URLLC slice identifier and an eMBB slice identifier, and wherein the telecommunications network maps the unique application identifier to the URLLC slice identifier and the eMBB slice identifier. The one or more processors are further configured to cause a session to be established for the URLLC slice and another session to be established for the eMBB slice for concurrent usage by the particular application at the user device. Via a tunnel associated with the URLLC slice, the data that corresponds to the first data type is received, wherein the data that corresponds to the first data type is communicated by the application using a first header based on the predefined policy. And, via another tunnel associated with the eMBB slice, the other data that corresponds to the other data type is communicated using the eMBB slice, wherein the other data that corresponds to the other data type is communicated by the application using a second header based on the predefined policy that is specific to the particular application.

BRIEF DESCRIPTION OF THE DRAWINGS

Aspects are described in detail below with reference to the attached drawings figures, wherein.

DETAILED DESCRIPTION

Figure 1:
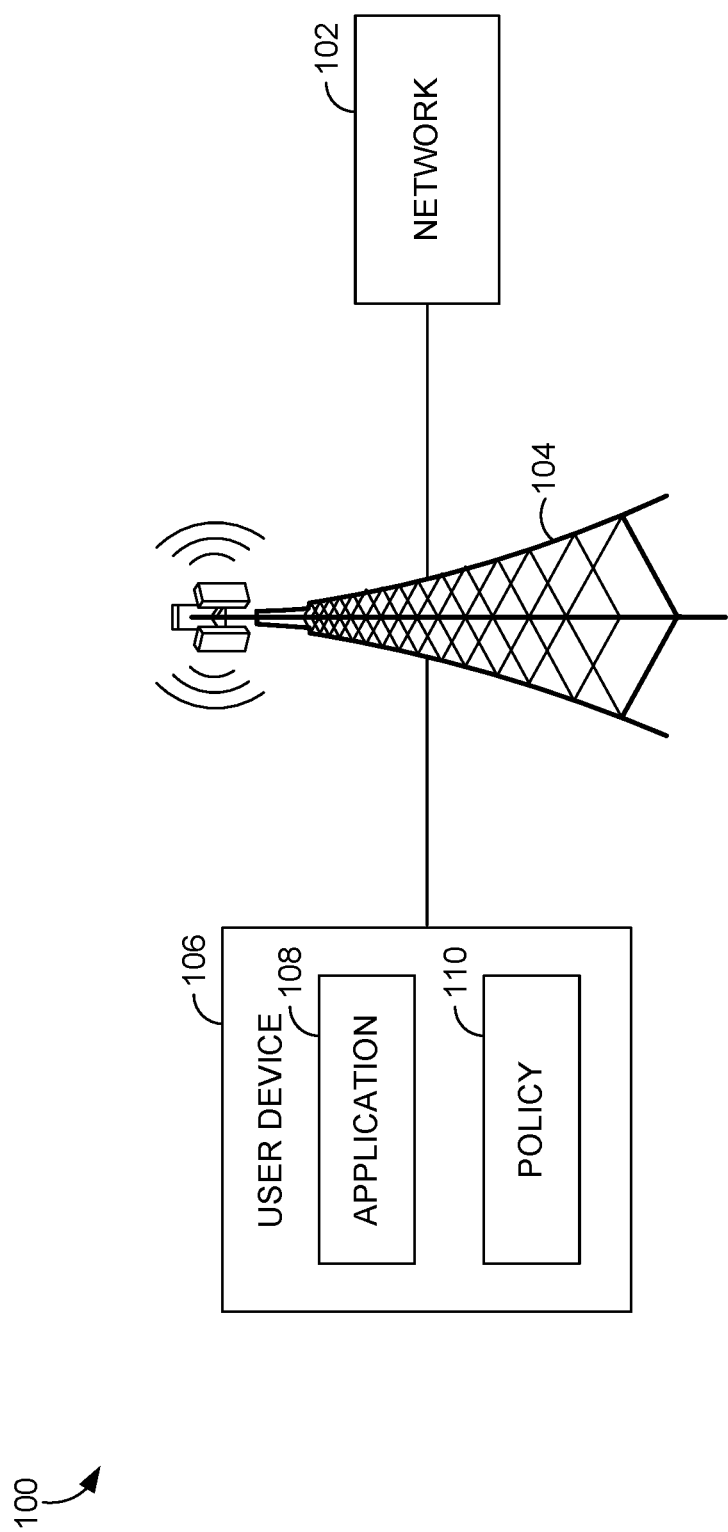
FIG. 1 depicts an example of a system in accordance with one or more embodiments.

The subject matter of the present invention is being described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Terms should not be interpreted as implying any particular order among or between various steps herein disclosed unless and except when the order of individual steps is explicitly described. As such, although the terms "step" and/or "block" may be used herein to connote different elements of the system and/or methods, the terms should not be interpreted as implying any particular order and/or dependencies among or between various components and/or steps herein disclosed unless and except when the order of individual steps is explicitly described. The present disclosure will now be described more fully herein with reference to the accompanying drawings, which may not be drawn to scale and which are not to be construed as limiting. Indeed, the present invention can be embodied in many different forms and should not be construed as limited to the embodiments set forth herein.

Throughout this disclosure, several acronyms and shorthand notations are used to aid the understanding of certain concepts pertaining to the associated system and services. These acronyms and shorthand notations are intended to help provide an easy methodology of communicating the ideas expressed herein and are not meant to limit the scope of the present invention. The following is a list of these acronyms:

3G Third-Generation Wireless Access Technology
4G Fourth-Generation Wireless Access Technology
5G Fifth-Generation Wireless Access Technology
5GC Fifth-Generation Wireless Access Technology Core Network
CDMA Code Division Multiple Access
CD-ROM Compact Disk Read Only Memory
CU Central unit
DU Distribution unit
DVD Digital Versatile Disc
EEPROM Electrically Erasable Programmable Read-Only Memory
eMBB Enhanced Mobile Broadband
E-UTRAN Evolved Universal Mobile Telecommunications System
FD-MIMO Full Dimension Multiple-Input Multiple-Output
GIS Geographic/Geographical/Geospatial Information System
GPRS General Packet Radio Service
GSM Global System for Mobile Communications
iDEN Integrated Digital Enhanced Network
IIOT Industry Internet of Things
IOT Internet of Things
LED Light Emitting Diode
LTE Long Term Evolution
MD Mobile Device
MEC Mobile Far Edge Computer
MIMO Multiple-Input Multiple-Output
mMIMO Massive Multiple-Input Multiple-Output
mMTC Massive Machine Type Communication
mmWave Millimeter Wave
NEXRAD Next-Generation Radar
NR New Radio
PC Personal Computer
PCS Personal Communications Service
PDA Personal Digital Assistant
PLMN Public Land Mobile Network
RAM Random Access Memory
RAN Radio Access Network
RF Radio-Frequency
ROM Read-Only Memory
RRU Remote Radio Unit
RU Radio Unit
SON Self-Organizing Networks
TDMA Time Division Multiple Access
TXRU Transceiver
UE User Equipment
UMTS Universal Mobile Telecommunications System
URLLC Ultra-Reliable Low Latency Communications
UTRAN Universal Terrestrial Radio Access Network
WCD Wireless Communication Device (interchangeable with UE)
WLAN Wireless Local Area Network
XR Extended Reality Further, various technical terms are used throughout this description. An illustrative resource that fleshes out various aspects of these terms can be found in Newton's Telecom Dictionary, 25th Edition (2009).

Embodiments herein may be embodied as, among other things: a method, system, or set of instructions embodied on one or more computer-readable media. Computer-readable media include both volatile and nonvolatile media, removable and non-removable media, and contemplate media readable by a database, a switch, and various other network devices. Computer-readable media includes media implemented in any way for storing information. Examples of stored information include computer-useable instructions, data structures, program modules, and other data representations. Media examples include RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data momentarily, temporarily, or permanently. Embodiments may take the form of a hardware embodiment, or an embodiment combining software and hardware. Some embodiments may take the form of a computer program product that includes computer-useable or computer-executable instructions embodied on one or more computer-readable media.

"Computer-readable media" can be any available media and may include volatile and nonvolatile media, as well as removable and non-removable media. By way of example, and not limitation, computer-readable media may include computer storage media and communication media.

"Computer storage media" may include, without limitation, volatile and non-volatile media, as well as removable and non-removable media, implemented in any method or technology for storage of information, such as computer-readable instructions, data structures, program modules, or other data. In this regard, computer storage media may include, but is not limited to, RAM, ROM, EEPROM, flash memory or other memory technology, CD-ROM, DVDs or other optical disk storage, magnetic cassettes, magnetic tape, magnetic disk storage, or other magnetic storage device, or any other medium which can be used to store the desired information and which may be accessed by the computing device 400 shown in FIG. 4.

"Communication media" may include, without limitation, computer-readable instructions, data structures, program modules, or other data in a modulated data signal, such as a carrier wave or other transport mechanism, and may include any information delivery media. As used herein, the term "modulated data signal" refers to a signal that has one or more of its attributes set or changed in such a manner as to encode information in the signal. By way of example, and not limitation, communication media includes wired media such as a wired network or direct-wired connection, and wireless media such as acoustic, radio frequency (RF), infrared, and other wireless media. Combinations of any of the above may also be included within the scope of computer-readable media.

"Network" refers to a network comprised of wireless and wired components that provide wireless communications service coverage to one or more UE. For example, the network may include one or more, or a plurality of, wireless networks, hardwired networks, telecommunication networks, peer-to-peer networks, distributed networks, and/or any combination thereof. The network may comprise one or more base stations, one or more cell sites (i.e., managed by a base station), one or more cell towers (i.e., having an antenna) associated with each base station or cell site, a gateway, a backhaul server that connects two or more base stations, a database, a power supply, sensors, and other components not discussed herein, in various embodiments. Examples of a network include a telecommunications network (e.g., 3G, 4G, 5G, CDMA, CDMA 1×A, GPRS, EVDO, TDMA, GSM, LTE, and/or LTE Advanced). Additional examples of a network include a wide area network (WAN), a local area network (LAN), a metropolitan area network (MAN), a wide area local network (WLAN), a personal area network (PAN), a campus-wide network (CAN), a storage area network (SAN), a virtual private network (VPN), an enterprise private network (EPN), a home area network (HAN), a Wi-Fi network, a Worldwide Interoperability for Microwave Access (WiMax) network, and/or an ad-hoc (mesh) network. The network may include or may communicate with a physical location component for determining a geographic location of an item, package, parcel, personnel, vehicle, end-point location, etc., by leveraging, for example, a Global Positioning System (GPS), Globalnaya Navigazionnaya Sputnikovaya Sistema (GLONASS), BeiDou Navigation Satellite System (BDS), Global Navigation Satellite System (GNSS or "Galileo"), an indoor position system (IPS), or other positioning systems that leverage non-GPS signals or networks (e.g., signals of opportunity (SOP)).

"Base station" and "cell site" may be used interchangeably herein to refer to a defined wireless communications coverage area (i.e., a geographic area) serviced by a base station. It will be understood that one base station may control one cell site or, alternatively, one base station may control multiple cell sites. As discussed herein, a base station is deployed in the network to control and facilitate, via one or more antenna arrays, the broadcast, transmission, synchronization, and receipt of one or more wireless signals in order to communicate with, verify, authenticate, and provide wireless communications service coverage to one or more UE that request to join and/or are connected to a network.

"Access point" may refer to hardware, software, devices, or other components at a base station, cell site, and/or cell tower having an antenna, an antenna array, a radio, a transceiver, and/or a controller. Generally, an access point may communicate directly with user equipment according to one or more access technologies (e.g., 3G, 4G, LTE, 5G, mMIMO) as discussed hereinafter. Access point refers to a device with complex software that is specifically configured to provide one or more user devices with a connection and/or access to a wireless network using, for example, an antenna, an antenna array, and/or one or more antenna elements. Examples of an access point include a cell tower, a cell site, a base station, a NodeB, an eNodeB, a gNodeB, a macro cell, a micro cell, a femtocell, a picocell, and/or a computing device capable of acting as a wireless "hotspot." The terms "access point," "cell site," "base station," and "cell tower" are used interchangeably for simplicity and thus the terms should not be construed as limiting with regard to one another unless expressly designated as such in this Detailed Description. Examples of a cell site include macro cells such as a cell tower controlled by a gNodeB, as well as small cells, such as a femto cell or pico cell. Accordingly, the scale and coverage area of an access point is not limited to the examples discussed, and any size and shape of coverage area is contemplated to be within the scope of the invention. Because a cell tower and a base station controlling the cell tower may be remote from one another, or alternatively may be localized to each other, the term access point is not intended to be so limited as to require a cell tower and/or antenna. Generally, an access point, as discussed herein, is intended to refer to any device, whether local or remote to a physical location of a cell tower and/or antenna, having complex software that is specifically configured to provide one or more user devices with a connection and/or access to a wireless network.

"User equipment," "UE," "mobile device," "user device," and "wireless communication device" are used interchangeably to refer to a device employed by an end-user that communicates using a network. UE generally includes one or more antenna coupled to a radio for exchanging (e.g., transmitting and receiving) transmissions with a nearby base station, via an antenna array of the base station. In embodiments, UE may take on any variety of devices, such as a personal computer, a laptop computer, a tablet, a netbook, a mobile phone, a smartphone, a personal digital assistant, a wearable device, a fitness tracker, or any other device capable of communicating using one or more resources of the network. UE may include components such as software and hardware, a processor, a memory, a display component, a power supply or power source, a speaker, a touch-input component, a keyboard, and the like. In embodiments, some of the UE discussed herein may include current UE capable of using 5G and having backward compatibility with prior access technologies, current UE capable of using 5G and lacking backward compatibility with prior access technologies, and legacy UE that is not capable of using 5G.

Terms such as "network slicing" and "slice" refers to dividing a network into one or more portions, wherein each portion may operate at its own network. This can be achieved using one or more virtualized configurations generated above or on top of a physical layer in a network infrastructure. An example a network slice include eMBB, URLLC, and mMTC. As will be understood by those skilled in the art, each type of slice (e.g., eMBB versus URLLC) may have a different component configuration within the control plan and data plan relative to one another. For example, the arrangement, location, or placement of components such as a central unit, an application server, a distribution unit, and other components may operate from different locations, such as the edge, local, or core segments in the telecommunications network.

The terms "radio," "controller," "antenna," and "antenna array" are used interchangeably to refer to one or more software and hardware components that facilitate sending and receiving wireless radio-frequency signals, for example, based on instructions from a base station. A radio may be used to initiate and generate information that is then sent out through the antenna array, for example, where the radio and antenna array may be connected by one or more physical paths. Generally, an antenna array comprises a plurality of individual antenna elements. The antennas discussed herein may be dipole antennas, having a length, for example, of ¼, ½, 1, or 1½ wavelength. The antennas may be monopole, loop, parabolic, traveling-wave, aperture, yagiuda, conical spiral, helical, conical, radomes, horn, and/or apertures, or any combination thereof. The antennas may be capable of sending and receiving transmission via FD-MIMO, mMIMO, 3G, 4G, 5G, and/or 802.11 protocols and techniques.

Additionally, it will be understood that sequential or relative terms such as "first," "second," and "third" are used herein for the purposes of clarity in distinguishing between elements or features, but the terms are not used herein to import, imply, or otherwise limit the relevance, importance, quantity, technological functions, physical or temporal sequence, physical or temporal order, and/or operations of any element or feature unless specifically and explicitly stated as such.

At a high level, embodiments discussed herein enable an individual software application to provision and concurrently utilize more than a single slice at a given time. Specifically, embodiment herein facilitate provisioning one or more eMBB slices and one or more URLLC slices for concurrent utilization, in combination with each other, for example. After an eMBB slice and a URLLC slice have been provisioned by the individual application over the network, the application and/or the network maps the unique identifier for the eMBB slice and the unique identifier of the URLLC slice to the unique identifier for the application ID. Based on a customized and/or predefined data policy that is specific to the application, the application communicates high priority data using the URLLC slice and non-priority data using the eMBB slice, wherein distinct or various data types are defined in the policy as corresponding to high priority or non-priority levels. In utilizing the eMBB slice and URLLC slice concurrently to communication distinct data types over the network, the application utilizes a particular IP header for the high priority data and another particular IP header for the non-high priority data, wherein those IP headers may be generated or predefined by the application, for example. Each unique IP header is utilized to direct how distinct data types are communicated over each respective slice (e.g., URLLC or eMBB) for communication with the network. In this manner, embodiments herein enable an application running at user equipment to communicate high priority data using a URLLC slice that relies on smaller packet sizes in order to provide increased reliability (e.g., <1% data packet loss) and relatively low latency compared to eMBB or mMTC. Meanwhile, embodiments herein enable that same application running at the same user equipment to communicate non-priority data using the eMBB slice. In combination, this multiple slice utilization optimizes capacity for the application and the network by spreading the total data traffic for that application across multiple slices, while ensuring that priority data is communicated reliability and with minimal data loss by utilizing both eMBB and URLLC slices in combination.

In contrast, within present telecommunications technologies or systems, a software application generally provisions a single slice for utilization of data packet communication, and that single slice might be one of eMBB, URLLC, or mMTC, for example. As such, the embodiments herein improve the relevant technology or technical field by enabling an individual software application to provision and concurrently utilize more than a single slice at a given time. This improves the relevant technology or technical field because such embodiments optimize capacity for the application and the network by spreading the total data traffic for that application across multiple slices, while ensuring that priority data is communicated reliably and with minimal data loss by utilizing both eMBB and URLLC slices in combination.

Beginning with FIG. 1, a system 100 is provided for improved data transmission reliability and optimized bandwidth capacity. In aspects, the system 100 includes a network 102 and a base station 104. The network 102 and the base station 104 provide service with a user device 106 that has an application 108 and a predefined policy 110 that is specific to the application 108. Examples of the network 102, access points such as the base station 104, and the user device 106 have been previously described herein.

The application 108 comprises a computer software program that can be executed and run on the user device, in whole or partially (e.g., utilizing the network 102, the cloud, or other remote computing device).

The predefined policy 110 is generally specific to the application 108 or otherwise customized to optimize the application 108 and network transmissions, as further discussed herein. The predefined policy 110 is used to define one or more specific data types that are critical to the function, operations, and/or performance of the application 108, and to define one or more other specific data types that are non-critical. Through the predefined policy 110, a prioritization schema for different data types that are associated with the application 108 is defined. Further, as the predefined policy 110 can be modified or updated, the prioritization schema for different data types of the application 108 can be further optimized, refined, or restructured to improve data communications of the application 108 within the network 102.

For example, in a scenario where the application 108 provides an augmented reality experience at the user device 106, the predefined policy 110 may specify that a first data type of Intermediate frame (iFrame) data is high priority. In this example, iFrame data is defined by the predefined policy 110 as high priority data because the successful and complete transmission (e.g., without packet loss) of iFrame data critical to the ability of the application 108 to capture and render a seamless and immersive augmented reality experience at the user device based on sensor and positioning data. As such, the application 108 would access the predefined policy 110 and utilize it to transmit all data of the iFrame data type using the URLLC slice that is provisioned, as further discussed herein, while other data types would be transmitted using the eMBB slice. In this example, the application 108 utilizes and implements the policy in order to determine which data packets of various data types will be transmitted from the application 108 using specific slices. It will be understood that this is just one example such that other customized policies and other application types are contemplated to be within the scope of this disclosure.

Figure 2:
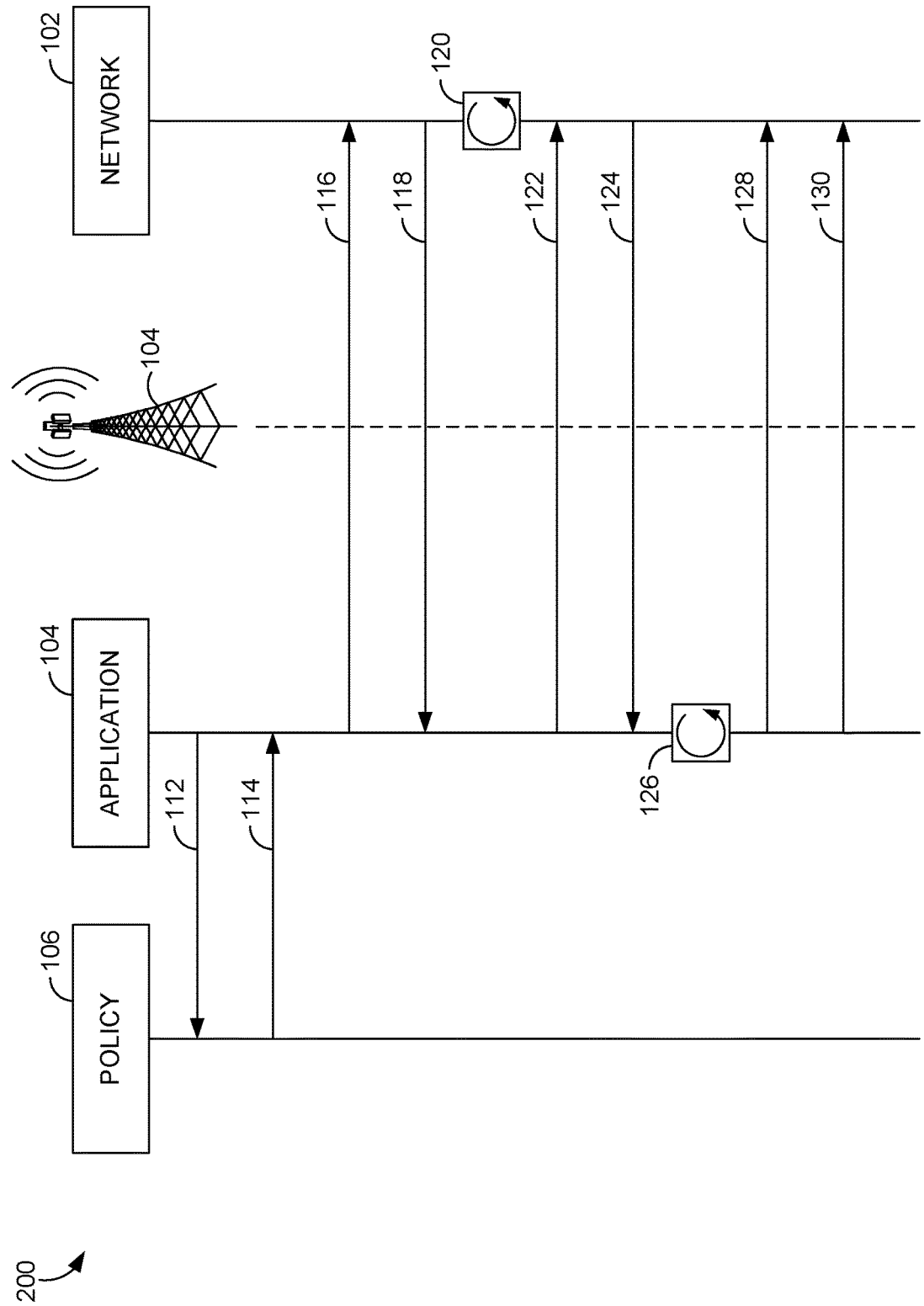
FIG. 2 depicts a flowchart of an example method involving components of FIG. 1, in accordance with one or more embodiments.

FIG. 2 provides a flowchart of an example method 200 involving the system components of FIG. 1. In embodiments, the network 102 is communicatively coupled to a user device 106, for example, through the base station 104 that provides wireless access the network 102. In some aspects, the application 108 is instantiated or launched at the user device 106. The application 108 may request 112 and retrieve 114 a predefined policy 110 that is stored locally or remotely, for example. The application 108 may, based on the predefined policy 110, communicate 116 a request to the network 102, wherein the request specifies that the application 108 seeks to provision a URLLC slice and an eMBB slice from the network 102. The network 102 may, using a unique application identifier for that particular application instantiated at the user device, provision the requested slices. As such, in response to the request, the network 102 may communicate 118 a confirmation to the application 108 that a URLLC slice and an eMBB slice are provisioned for the particular application.

In some embodiments, the confirmation includes a URLLC slice identifier and an eMBB slice identifier. The network 102 also maps 120 the unique application identifier to the URLLC slice identifier and the eMBB slice identifier, in such embodiments. For example, the URLLC slice identifier may include a first Network Slice Selection Assistance Information (NSSAI) assigned by the network and/or the eMBB slice identifier may include a second NSSAI assigned by the network. Further, in such an example, each of the first and second NSSAI may designate a corresponding Slice/Service Type (SST) and a corresponding slice differentiator (SD) assigned by the network.

The application 108 may continue by communicating 122 a request to the network 102, wherein the request is to establish a separate, concurrent session for each of the URLLC slice and the eMBB slice. The request may request may include the URLLC slice identifier and the eMBB slice identifier, as well as the unique application identifier, in some embodiments. In response to the request, the network 102 may establish a session for the URLLC slice and another session for the eMBB slice for concurrent usage by the particular application at the user device. The network 102 communicates 124 the session information to the application 108 for subsequent utilization in the transmission of data. The session information may identify a specific tunnel or path for routing data utilizing the URLLC slice and another specific tunnel or path for routing data utilizing the eMBB slice. In some embodiments these sessions are Protocol Data Unit (PDU) sessions.

As the application 108 runs and generates data for transmission, the application can generate 126 unique headers for different data types that are to be transmitted over the network 102. For example, the predefined policy 110 may specify that a first data type corresponds to high priority data for the particular application whereas another data type corresponds to non-priority data for the particular application. Based on the predefined policy 110, the application 108 may generate a first header that is to be utilized to communicate data that is of the first data type that is high priority, while also generating a second header that is to be utilized to communicate data that is of the other data type(s), which are non-priority data type(s).

Then, via a tunnel associated with the URLLC slice, the application 108 communicates 128 the data that corresponds to the first data type to the network 102, wherein the data that corresponds to the first data type is communicated by the application 108 using a first header based on the predefined policy. In some aspects, the network 102 may provide a response (not shown), depending on the nature and content of the data communicated, using either or the URLLC or eMBB slices. Via another tunnel associated with the eMBB slice, the application 108 communicates 130 the other data that corresponds to the other data type to the network 102 using the eMBB slice, wherein the other data that corresponds to the other data type is communicated by the application 108 using a second header based on the predefined policy 110. In some aspects, the network 102 may provide a response. In some aspects, the network 102 may provide a response (not shown), depending on the nature and content of the data communicated, using either or the URLLC or eMBB slices. For example, the network 102 may utilize a filter to sort data and associated communications having the first header data relative to those with the second header, for example, based on the predefined policy 110 that is specific to the application 108.

In this manner, the application 108 is enabled to communicate high priority data types that are critical to the function, operations, and/or performance of the application 108 over a URLLC slice, through the predefined policy 110. This ensures that the priority data is reliably transmitted over the network 102 using the low-latency, smaller packet size, and redundant/repetitive small packet transmission techniques of the URLLC. Additionally, the application 108 is enabled to communicate non-priority data types that are less critical to the function, operations, and/or performance of the application 108 over an eMBB slice, through the predefined policy 110. This shifts the non-priority data transmissions or traffic off of the bandwidth of the URLLC slice and onto the higher bandwidth capacity and higher data rates associated with eMBB.

Having described the system 100 and components thereof, it will be understood by those of ordinary skill in the art that system 100 is but one example of a suitable system and is not intended to limit the scope of use or functionality of the present invention. Similarly, system 100 should not be interpreted as imputing any dependency and/or any requirements with regard to each component and combination(s) of components illustrated in FIGS. 1 and 2. It will be appreciated by those of skill in the art that the location of components illustrated in FIGS. 1 and 2 are an example, as other methods, hardware, software, components, and devices for establishing a communication links between the components shown in FIGS. 1 and 2 may be utilized in implementations of the present invention. It will be understood to those of skill in the art that the components may be connected in various manners, hardwired or wireless, and may use intermediary components that have been omitted or not included in FIGS. 1 and 2 for simplicity's sake. As such, the absence of components from FIGS. 1 and 2 should be not be interpreted as limiting the present invention to exclude additional components and combination(s) of components. Moreover, though components are represented in FIGS. 1 and 2 as singular components, it will be appreciated that some embodiments may include a plurality of devices and/or components such that FIGS. 1 and 2 should not be considered as limiting the number of a device or component.

Figure 3:
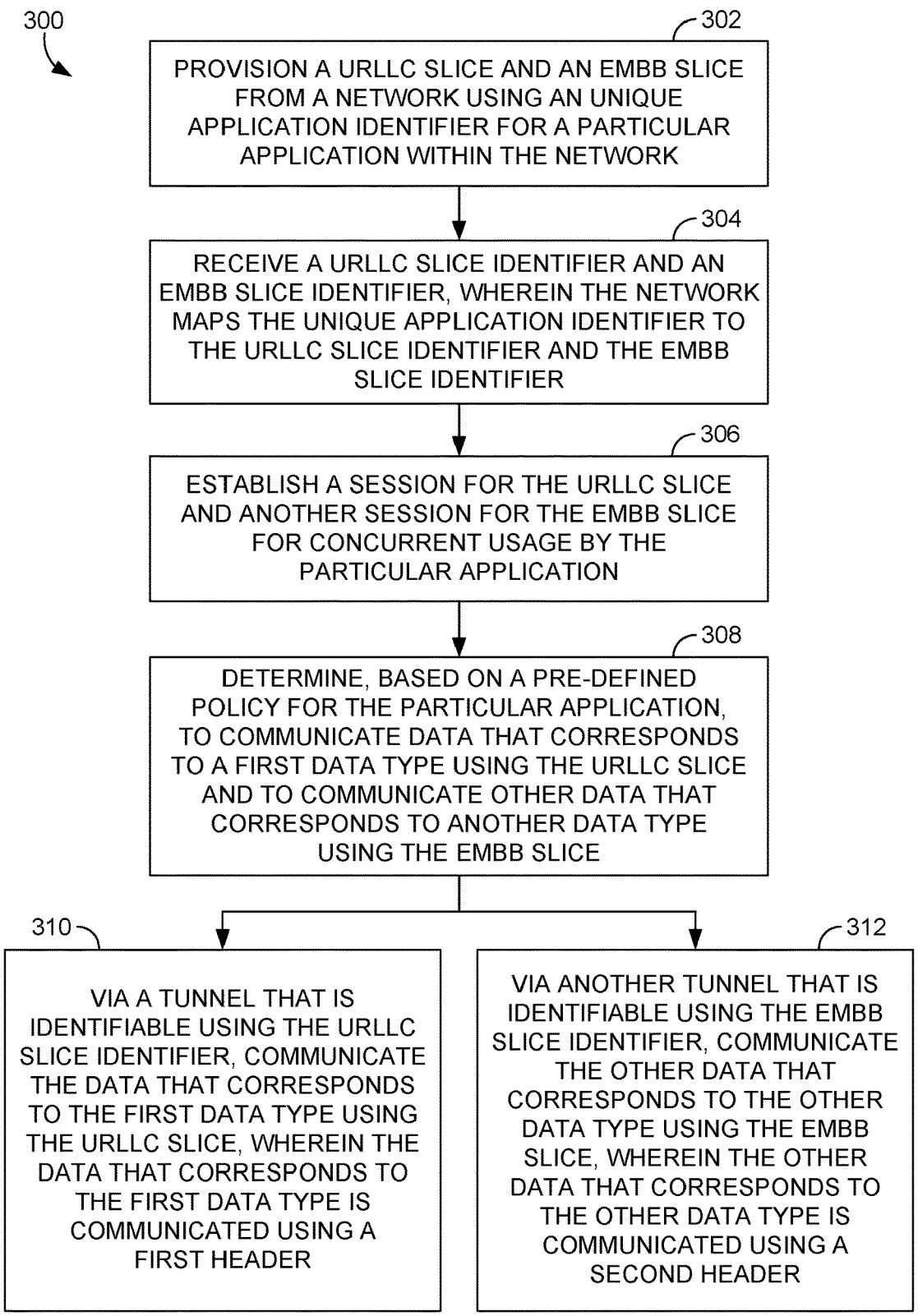
FIG. 3 depicts a flowchart of an example method in accordance with one or more embodiments.

FIG. 3 illustrates a flowchart of an example method 300 for improved data transmission reliability and optimized bandwidth capacity. At block 302, a URLLC slice and an eMBB slice are provisioned from a network using a unique application identifier for a particular application within the network. At block 304, a URLLC slice identifier and an eMBB slice identifier are received, wherein the network maps the unique application identifier to the URLLC slice identifier and the eMBB slice identifier. In some embodiments, the URLLC slice identifier comprises a first Network Slice Selection Assistance Information (NSSAI) and the eMBB slice identifier comprises a second NSSAI. In such an example, each of the first and second NSSAI designate a corresponding Slice/Service Type (SST) and a corresponding slice differentiator (SD). At block 306, a session for the URLLC slice and another session for the eMBB slice are established for concurrent usage by the particular application. In some embodiments, the session for the URLLC slice and the other session for the eMBB slice are each Protocol Data Unit (PDU) sessions. As such, the application concurrently holds multiple sessions established with the network for that application.

At block 308, it is determined, based on a predefined policy for the particular application, to communicate data that corresponds to a first data type using the URLLC slice and to communicate other data that corresponds to another data type using the eMBB slice. For example, in some embodiments, the application may access a predefined policy that is specific to or otherwise customized for the particular application, wherein the predefined policy specifies that the first data type corresponds to high priority data for the particular application, and wherein the predefined policy specifies that the other data type corresponds to non-priority data for the particular application. It will be understood that the predefined policy may be accessed prior to the provisioning and/or session setup, and the sequence of this method 300 is merely one example.

In one embodiment, the policy may define that the first data type may actually include a plurality of specific data types while the second data type consists of one specific data type that is distinct or different from the first data type(s). In another embodiment, the policy may define that the first data type consists of one specific data type while the second data type actually includes a plurality of specific data types that is distinct or different from the first data type. In yet another embodiment, the policy may define that the first data type includes a first plurality of specific data type while the second data type includes a second plurality of specific data types that are distinct or different from the first data type(s).

Via a tunnel that is identifiable using the URLLC slice identifier, the data that corresponds to the first data type is communicated using the URLLC slice, shown at block 310, wherein the data that corresponds to the first data type is communicated using a first header. As such, the application or the network may generate a first header that is specific to high priority data. At block 312, via another tunnel that is identifiable using the eMBB slice identifier, the other data that corresponds to the other data type is communicated using the eMBB slice, wherein the other data that corresponds to the other data type is communicated using a second header. As such, the application or the network may generate the second header as specific to non-priority data, per the predefined policy.

Figure 4:
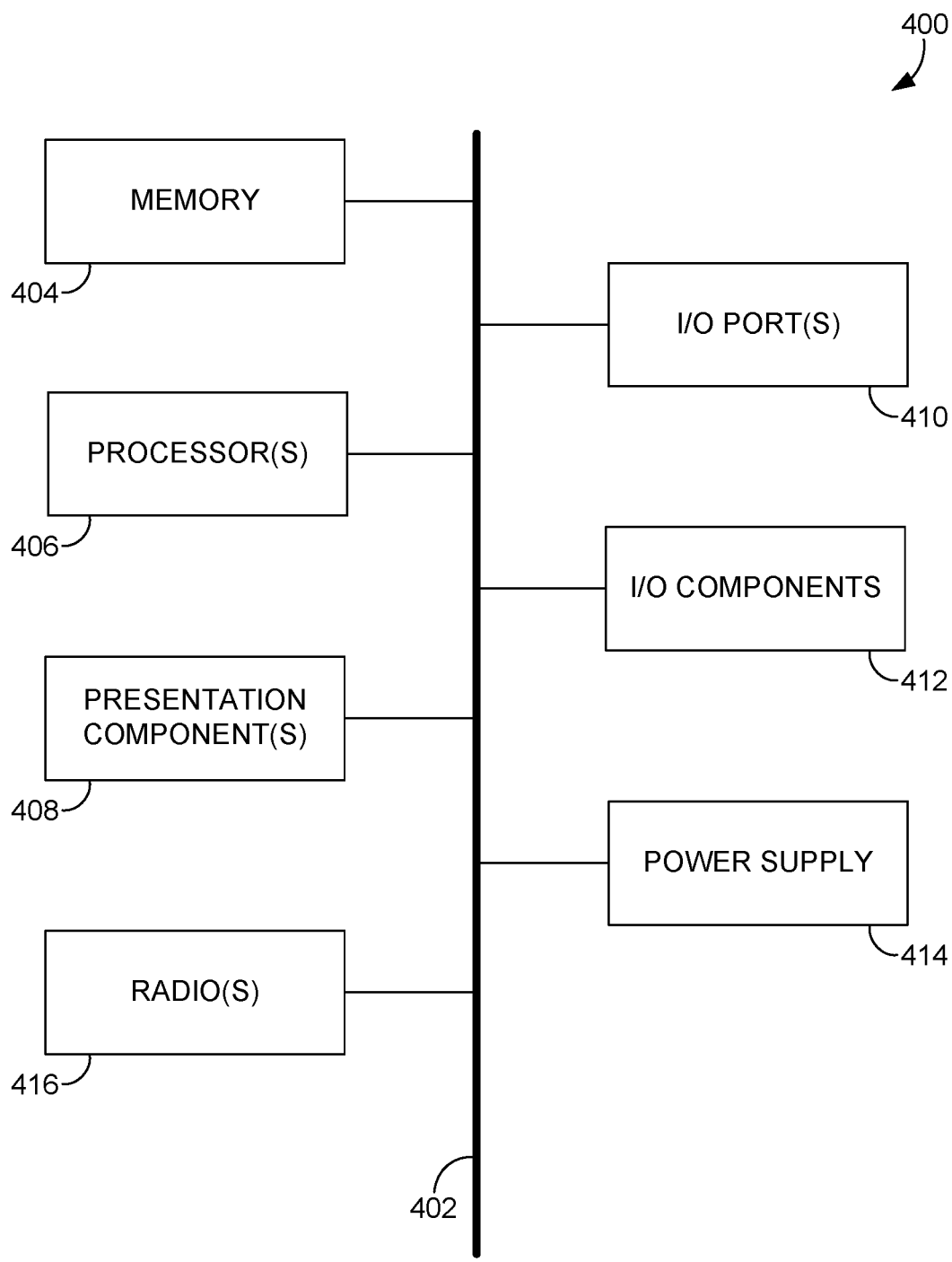
FIG. 4 illustrates an example computing device suitable for use in implementations of the present disclosure.

Turning now to FIG. 4, a diagram is depicted of an example computing device 400 suitable for use in implementations of the present disclosure. Computing device 400 is but one example of a suitable computing environment and is not intended to suggest any limitation as to the scope of use or functionality of the invention. Neither should computing device 400 be interpreted as having any dependency or requirement relating to any one or combination of components illustrated.

The implementations of the present disclosure may be described in the general context of computer code or machine-useable instructions, including computer-executable instructions such as program components, being executed by a computer or other machine, such as a personal data assistant or other handheld device. Generally, program components, including routines, programs, objects, components, data structures, and the like, refer to code that performs particular tasks or implements particular abstract data types. Implementations of the present disclosure may be practiced in a variety of system configurations, including handheld devices, consumer electronics, general-purpose computers, specialty computing devices, etc. Implementations of the present disclosure may also be practiced in distributed computing environments where tasks are performed by remote-processing devices that are linked through a communications network.

With continued reference to FIG. 4, computing device 400 includes bus 402 that directly or indirectly couples the following devices: memory 404, one or more processors 406, one or more presentation components 408, input/output (I/O) ports 410, I/O components 412, and power supply 414. Bus 402 represents what may be one or more busses (such as an address bus, data bus, or combination thereof). Although the devices of FIG. 4 are shown with lines for the sake of clarity, in reality, delineating various components is not so clear, and metaphorically, the lines would more accurately be grey and fuzzy. For example, one may consider a presentation component such as a display device to be one of the I/O components 412. Also, processors, such as one or more processors 406, have memory. Distinction is not made between such categories as "workstation," "server," "laptop," "handheld device," etc., as all are contemplated within the scope of FIG. 4 and refer to "computer" or "computing device."

Computing device 400 typically includes a variety of computer-readable media. Computer-readable media can be any available media that can be accessed by computing device 400 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data.

Computer storage media includes RAM, ROM, EEPROM, flash memory or other memory technology, CD-ROM, digital versatile disks (DVD) or other optical disk storage, magnetic cassettes, magnetic tape, magnetic disk storage or other magnetic storage devices. Computer storage media does not comprise a propagated data signal.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 404 includes computer-storage media in the form of volatile and/or nonvolatile memory. Memory 404 may be removable, non-removable, or a combination thereof. Examples of memory include solid-state memory, hard drives, optical-disc drives, etc. Computing device 400 includes one or more processors 406 that read data from various entities such as bus 402, memory 404 or I/O components 412. One or more presentation components 408 present data indications to a person or other device. Examples of one or more presentation components 408 include a display device, speaker, printing component, vibrating component, etc. I/O ports 410 allow computing device 400 to be logically coupled to other devices, including I/O components 412, some of which may be built in computing device 400. Examples of I/O components 412 include a microphone, joystick, game pad, satellite dish, scanner, printer, wireless device, etc.

Radio 416 represents a radio that facilitates communication with a wireless telecommunications network. Illustrative wireless telecommunications technologies include CDMA, GPRS, TDMA, GSM, and the like. Radio 416 might additionally or alternatively facilitate other types of wireless communications including Wi-Fi, WiMAX, LTE, or other VoIP communications. As can be appreciated, in various embodiments, radio 416 can be configured to support multiple technologies and/or multiple radios can be utilized to support multiple technologies. A wireless telecommunications network might include an array of devices, which are not shown so as to not obscure more relevant aspects of the invention. Components such as a base station, a communications tower, or even access points (as well as other components) can provide wireless connectivity in some embodiments.

Many different arrangements of the various components depicted, as well as components not shown, are possible without departing from the scope of the claims below. Embodiments of our technology have been described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

What is claimed is:

1. A computerized method for improved data transmission reliability and optimized bandwidth capacity, the method comprising:
   provisioning a URLLC slice and an eMBB slice from a network using a unique application identifier for a particular application within the network;
   receiving a URLLC slice identifier and an eMBB slice identifier, wherein the network maps the unique application identifier to the URLLC slice identifier and the eMBB slice identifier;
   establishing a session for the URLLC slice and another session for the eMBB slice for concurrent usage by the particular application;
   determining, based on a predefined policy for the particular application, to communicate data that corresponds to a first data type using the URLLC slice and to communicate other data that corresponds to another data type using the eMBB slice;
   via a tunnel that is identifiable using the URLLC slice identifier, communicating the data that corresponds to the first data type using the URLLC slice, wherein the data that corresponds to the first data type is communicated using a first header; and
   via another tunnel that is identifiable using the eMBB slice identifier, communicating the other data that corresponds to the other data type using the eMBB slice, wherein the other data that corresponds to the other data type is communicated using a second header.

2. The method of claim 1, further comprising accessing the predefined policy for the particular application, wherein the predefined policy specifies that the first data type corresponds to high priority data for the particular application, and wherein the predefined policy specifies that the other data type corresponds to non-priority data for the particular application.

3. The method of claim 2, further comprising generating the first header as specific to high priority data and the second header as specific to non-priority data, per the predefined policy.

4. The method of claim 1, wherein the URLLC slice identifier comprises a first Network Slice Selection Assistance Information (NSSAI), wherein the eMBB slice identifier comprises a second NSSAI, wherein each of the first and second NSSAI designate a corresponding Slice/Service Type (SST) and a corresponding slice differentiator (SD).

5. The method of claim 1, wherein the session for the URLLC slice and the other session for the eMBB slice are Protocol Data Unit (PDU) sessions.

6. The method of claim 1, wherein the first data type comprises a plurality of specific data types.

7. The method of claim 1, wherein the other data type comprises another plurality of specific data types.

8. One or more non-transitory computer-readable media storing instructions that when executed via one or more processors performs a computerized method, the media comprising:
   via one or more processors:
   communicating a request to provision a URLLC slice and an eMBB slice from a network using a unique application identifier for a particular application instantiated at a user device;
   in response to the request, receiving confirmation from the network of the URLLC slice and the eMBB slice being provisioned for the particular application, wherein the confirmation include a URLLC slice identifier and an eMBB slice identifier, and wherein the network maps the unique application identifier to the URLLC slice identifier and the eMBB slice identifier;
   establishing a session for the URLLC slice and another session for the eMBB slice for concurrent usage by the particular application;
   determining, based on a predefined policy for the particular application, to communicate data that corresponds to a first data type using the URLLC slice and to communicate other data that corresponds to another data type using the eMBB slice;
   via a tunnel that is identifiable using the URLLC slice identifier, communicating the data that corresponds to the first data type using the URLLC slice, wherein the data that corresponds to the first data type is communicated by the application using a first header; and
   via another tunnel that is identifiable using the eMBB slice identifier, communicating the other data that corresponds to the other data type using the eMBB slice, wherein the other data that corresponds to the other data type is communicated by the application using a second header.

9. The media of claim 8, further comprising accessing the predefined policy for the particular application, wherein the predefined policy specifies that the first data type corresponds to high priority data for the particular application, and wherein the predefined policy specifies that the other data type corresponds to non-priority data for the particular application.

10. The media of claim 9, further comprising generating the first header as specific to high priority data and the second header as specific to non-priority data, per the predefined policy.

11. The media of claim 8, wherein the URLLC slice identifier comprises a first Network Slice Selection Assistance Information (NSSAI), wherein the eMBB slice identifier comprises a second NSSAI, wherein each of the first and second NSSAI designate a corresponding Slice/Service Type (SST) and a corresponding slice differentiator (SD).

12. The media of claim 8, wherein the session for the URLLC slice and the other session for the eMBB slice are Protocol Data Unit (PDU) sessions.

13. The media of claim 8, wherein the first data type comprises one or more specific data types, and wherein the other data type comprises a plurality of specific data types.

14. The media of claim 8, further comprising accessing the predefined policy that identifies a first data type as having a high priority level for a particular application.

15. A system for improved data transmission reliability and optimized bandwidth capacity, the system comprising:
a telecommunications network communicatively coupled to a user device; and
one or more processors communicatively coupled to the telecommunications network, the one or more processors configured to:
receiving a request from the user device to provision a URLLC slice and an eMBB slice from the telecommunications network using a unique application identifier for a particular application instantiated at the user device, wherein the particular application requests the URLLC slice and the eMBB slice based on a predefined policy that is specific to the particular application;
in response to the request, communicating a confirmation that the URLLC slice and the eMBB slice are provisioned for the particular application instantiated at the user device, wherein the confirmation include a URLLC slice identifier and an eMBB slice identifier, and wherein the telecommunications network maps the unique application identifier to the URLLC slice identifier and the eMBB slice identifier;
causing a session to be established for the URLLC slice and another session to be established for the eMBB slice for concurrent usage by the particular application at the user device;
via a tunnel associated with the URLLC slice, receiving the data that corresponds to the first data type, wherein the data that corresponds to the first data type is communicated by the application using a first header based on the predefined policy; and
via another tunnel associated with the eMBB slice, receiving the other data that corresponds to the other data type using the eMBB slice, wherein the other data that corresponds to the other data type is communicated by the application using a second header based on the predefined policy that is specific to the particular application.

16. The system of claim 15, wherein the predefined policy specifies that the first data type corresponds to high priority data for the particular application, and wherein the predefined policy specifies that the other data type corresponds to non-priority data for the particular application.

17. The system of claim 15, further comprising utilizing, by the telecommunications network, a filter that specifies the first header is specific to high priority data and the second header is specific to non-priority data, per the predefined policy that is specific to the application.

18. The system of claim 15, wherein the URLLC slice identifier comprises a first Network Slice Selection Assistance Information (NSSAI) assigned by the telecommunications network, wherein the eMBB slice identifier comprises a second NSSAI assigned by the telecommunications network, wherein each of the first and second NSSAI designate a corresponding Slice/Service Type (SST) and a corresponding slice differentiator (SD) assigned by the telecommunications network.

19. The system of claim 15, wherein the session for the URLLC slice and the other session for the eMBB slice are Protocol Data Unit (PDU) sessions.

20. The system of claim 15, wherein the first data type comprises one or more specific data types, and wherein the other data type comprises a plurality of specific data types.

* * * * *